March 19, 1940.     J. C. HUFFER     2,194,020
NUT LOCK
Filed Sept. 17, 1938

Inventor
J. C. Huffer
By Watson E. Coleman
Attorney

Patented Mar. 19, 1940

2,194,020

UNITED STATES PATENT OFFICE 2,194,020

NUT LOCK

Johnie C. Huffer, Sadler, Tex.

Application September 17, 1938, Serial No. 230,495

2 Claims. (Cl. 151—18)

This invention relates to nut locks, and it is an object of the invention to provide a lock of this kind whereby a clamping or pressure nut is effectively held to its bolt.

It is also an object of the invention to provide a lock of this kind including two nuts for threading upon a bolt, the outer nut serving as a holding member and also constituting a die, said holding nut being applied to the bolt upon a left hand turn and cutting its own thread in the bolt.

Another object of the invention is to provide a nut lock comprising two nuts reversely threading on the bolt together with means for effectually holding said nuts when applied against independent rotation.

The invention consists in the details of construction and in the combination and arrangement of the several parts of my improved nut lock whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein.

Figure 1:
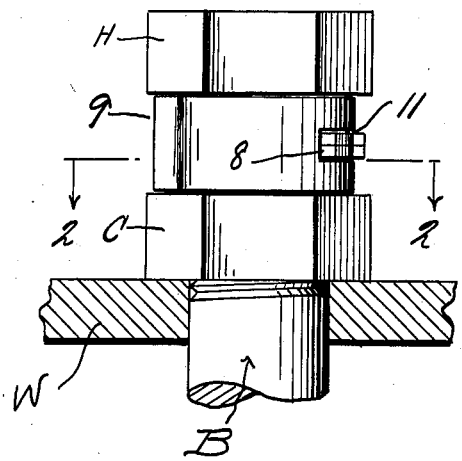
Figure 1 is a fragmentary view partly in section and partly in elevation illustrating a nut lock constructed in accordance with an embodiment of my invention.

As illustrated in Figures 1 to 5 of the drawing, my improved nut lock comprises a bolt B which initially is provided with the usual threads 2 with which engages a clamping or pressure nut C. After the nut C has been properly engaged with the work W the holding nut H is applied to the bolt B and turned thereon until the nut H comes into effective contact with the previously applied nut C. This nut H has its thread 3 reversely disposed with respect to the thread 4 of the clamping or pressure nut C so that when being applied the nut H is turned in a direction opposite to the direction of rotation of the nut C when being applied. The nut H constitutes a die so that as it is applied to the bolt B it cuts its own thread, as indicated at 5 in Figure 3. This assembly of the nuts C and H results in an effective lock to prevent loosening movement of the nut C.

However, to further assure the desired lock the nuts C and H as herein disclosed are specially constructed so that the opposed faces of the applied nuts are provided with the outstanding lugs 6 the inner faces of which are in continuity of the bores of the nuts. These lugs 6 are circumferentially spaced around the bore of each nut whereby said nut is of a castellated type providing intervening spaces 7 between adjacent lugs 6.

The outer end portions of the lugs 6 are provided with the outwardly and laterally directed lips 8.

Figure 3:
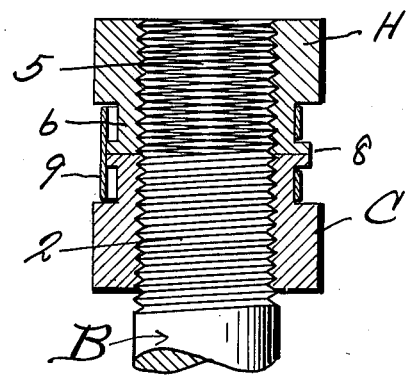
Figure 3 is a sectional view taken substantially on the line 3—3 of Figure 2 looking in the direction of the arrow and the associated bolt being in elevation.
Figure 2:
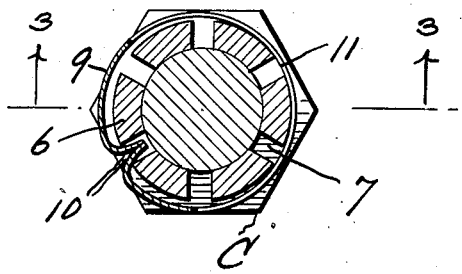
Figure 2 is a sectional view taken substantially on the line 2—2 of Figure 1 looking in the direction of the arrow.
Figure 4:
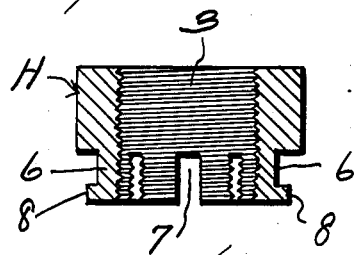
Figure 4 is a sectional view taken radially through the holding nut as herein comprised.

After the nuts H and C have been brought into proper assembly upon the bolt B the lugs 6 are closely surrounded by a metallic band 9 possessing a certain degree of inherent resiliency and the extremities 10 of said band, which is of a split type, are engaged in adjacent spaces 7 of both of the nuts. This band 9, as illustrated in Figure 3, is of a width substantially equal to the width between the assembled nuts C and H proper and at substantially its transverse center the band 9 is provided with a slot 11 extending along a major portion of the band 9. This slot 11 is of a width to snugly receive a number of substantially registering lips 8 of both of the nuts and thereby further effectively hold the nuts C and H against separating movement.

Figure 6:
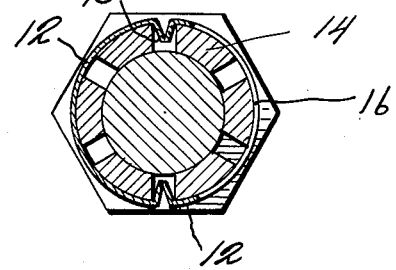
Figure 6 is a transverse sectional view illustrating a further embodiment of the invention.
Figure 5:
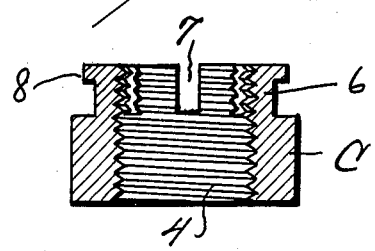
Figure 5 is a sectional view taken radially through the clamping or pressure nut as herein embodied.

In the embodiment of my invention as illustrated in Figure 6 of the drawing, the structure is substantially the same as has hereinbefore been described in connection with the first embodiment of the invention except that a plurality of metallic bands 12, herein disclosed as two in number, are employed, each of said bands extending partially around the lugs 14 with their extremities engaged, as at 15, between adjacent lugs. One of the bands 12 is provided with a slot 16 to receive the lips of the adjacent lugs 14.

While I have hereinbefore particularly stated that the nut H constitutes a die, it is to be understood and if preferred the nut C may be of a similar nature. It is also to be stated that it is preferred that the threads 3 of the nut H be greater in number to the inch than the threads 4 of the nut C, the threads 4 of the nut C preferably being standard.

It is also to be stated that by the use of nuts constructed in accordance with my invention they will effectively lock against movement in either direction along the bolt or shank B to which they may be applied and that, therefore, it is not necessary that the nut C be firm or tight against the work W.

From the foregoing description it is thought to be obvious that a nut lock constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A nut lock comprising two nuts reversely threading on a shank, the opposed faces of the nuts when applied being provided with outstanding lugs, the extremities of the lugs having outwardly disposed lips, a split resilient band disposed around the lugs and circumferentially of the nuts and having an elongated slot to receive the lips.

2. A nut lock comprising two nuts reversely threading on a shank, the opposed faces of the nuts when applied being provided with outstanding lugs, the extremities of the lugs having outwardly disposed lips, a split resilient band disposed around the lugs and circumferentially of the nuts and having an elongated slot to receive the lips, extremities of the band being engaged between adjacent lugs.

JOHNIE C. HUFFER.